(12) United States Patent
Pyra et al.

(10) Patent No.: US 11,988,240 B2
(45) Date of Patent: May 21, 2024

(54) LOCKING TAB-WASHER

(71) Applicant: PRATT & WHITNEY CANADA CORP., Longueuil (CA)

(72) Inventors: David Pyra, Longueuil (CA); Guy Lefebvre, St-Bruno-de-Montarville (CA); Gerard Theriault, Longueuil (CA)

(73) Assignee: PRATT & WHITNEY CANADA CORP., Qc (CA)

( * ) Notice: Subject to any disclaimer, the term of this patent is extended or adjusted under 35 U.S.C. 154(b) by 169 days.

(21) Appl. No.: 17/452,883

(22) Filed: Oct. 29, 2021

(65) Prior Publication Data
US 2023/0139607 A1 May 4, 2023

(51) Int. Cl.
*F02C 7/20* (2006.01)
*F16B 39/10* (2006.01)

(52) U.S. Cl.
CPC .............. *F16B 39/108* (2013.01); *F02C 7/20* (2013.01); *F05D 2220/32* (2013.01); *F05D 2260/31* (2013.01)

(58) Field of Classification Search
CPC ...... F16B 39/108; F02C 7/20; F05D 2220/32; F05D 2260/31
See application file for complete search history.

(56) References Cited

U.S. PATENT DOCUMENTS

| 223,622 | A | | 1/1880 | Wilson | |
|---|---|---|---|---|---|
| 955,577 | A | | 4/1910 | Bradshaw | |
| 972,086 | A | * | 10/1910 | Paterson | F16B 39/108 411/123 |
| 1,183,729 | A | * | 5/1916 | Hazel | F16B 39/108 411/201 |
| 1,228,679 | A | * | 6/1917 | Jones | F16B 39/108 411/944 |
| 1,397,252 | A | * | 11/1921 | Holmes | F16B 39/108 411/941 |
| 1,441,619 | A | * | 1/1923 | Wisch | F16B 39/108 411/941 |

(Continued)

FOREIGN PATENT DOCUMENTS

| CH | 346734 A | * | 5/1960 | ............ F16B 39/108 |
|---|---|---|---|---|
| CN | 112431843 A | * | 3/2021 | |

(Continued)

OTHER PUBLICATIONS

European Search Report issued in EP counterpart application No. 22204816.7 dated Feb. 22, 2023.

*Primary Examiner* — Courtney D Heinle
*Assistant Examiner* — Theodore C Ribadeneyra
(74) *Attorney, Agent, or Firm* — NORTON ROSE FULBRIGHT CANADA LLP

(57) ABSTRACT

A locking tab washer for rotatably locking a bolt fastened to a component in an aircraft engine has a body with an opening and at least four locking tabs positioned about the opening and circumferentially spaced apart from one another at integer multiples of a common angle relative to the center of the opening. The locking tabs are bendable towards to rotatably lock the bolt. The locking tab washer also has a retaining feature positioned about the opening and operable to rotatably retain the locking tab washer to the component.

13 Claims, 10 Drawing Sheets

(56) References Cited

U.S. PATENT DOCUMENTS

| | | | | |
|---|---|---|---|---|
| 1,685,120 A | * | 9/1928 | Carns | F16B 39/108 411/934 |
| 1,749,600 A | * | 3/1930 | Olson | F16B 39/108 411/959 |
| 1,871,684 A | * | 8/1932 | Gibbons | F16B 39/108 411/983 |
| 1,894,631 A | * | 1/1933 | Owen | F16B 39/24 411/979 |
| 2,561,224 A | * | 7/1951 | Pischek | F16B 39/108 411/983 |
| 4,787,791 A | | 11/1988 | Lambousy et al. | |
| 5,022,875 A | * | 6/1991 | Karls | B63H 23/34 440/49 |
| 5,618,143 A | * | 4/1997 | Cronin, II | F16D 41/061 411/948 |
| 5,772,373 A | * | 6/1998 | Cronin, II | F16B 39/108 411/948 |
| 6,976,816 B2 | | 12/2005 | Slesinski et al. | |
| 9,822,667 B2 | | 11/2017 | Porter et al. | |
| 9,945,411 B2 | | 4/2018 | Harris et al. | |
| 10,227,892 B2 | | 3/2019 | Fryer | |
| 2009/0103998 A1 | * | 4/2009 | Gagneur | F16B 39/24 411/196 |
| 2015/0192167 A1 | * | 7/2015 | Harris | F16B 39/101 29/505 |
| 2016/0290166 A1 | * | 10/2016 | Max | F01D 25/125 |
| 2016/0290167 A1 | * | 10/2016 | Porter | F01D 9/065 |
| 2021/0080032 A1 | * | 3/2021 | Belen | F16L 3/11 |

FOREIGN PATENT DOCUMENTS

| | | | | | |
|---|---|---|---|---|---|
| FR | 989915 A | * | 9/1951 | | F16B 39/108 |
| FR | 3026447 A1 | * | 4/2016 | | B25B 23/0085 |
| FR | 3039230 A1 | * | 1/2017 | | F01D 25/24 |
| GB | 125349 A | * | 4/1919 | | F16B 39/108 |
| GB | 203204 A | * | 9/1923 | | F16B 39/108 |
| GB | 540325 A | * | 2/1941 | | F16B 39/1108 |
| GB | 743173 A | * | 1/1956 | | F16B 39/108 |
| GB | 910446 A | * | 11/1962 | | F16B 39/108 |
| GB | 2138912 A | * | 10/1984 | | F16B 39/108 |
| JP | 2005076645 A | | 3/2005 | | |
| KR | 20120007307 U | * | 4/2011 | | F16B 43/00 |
| KR | 20180061719 A | * | 6/2018 | | F16B 39/10 |
| SE | 201451145 A1 | * | 3/2016 | | F16B 39/108 |

\* cited by examiner

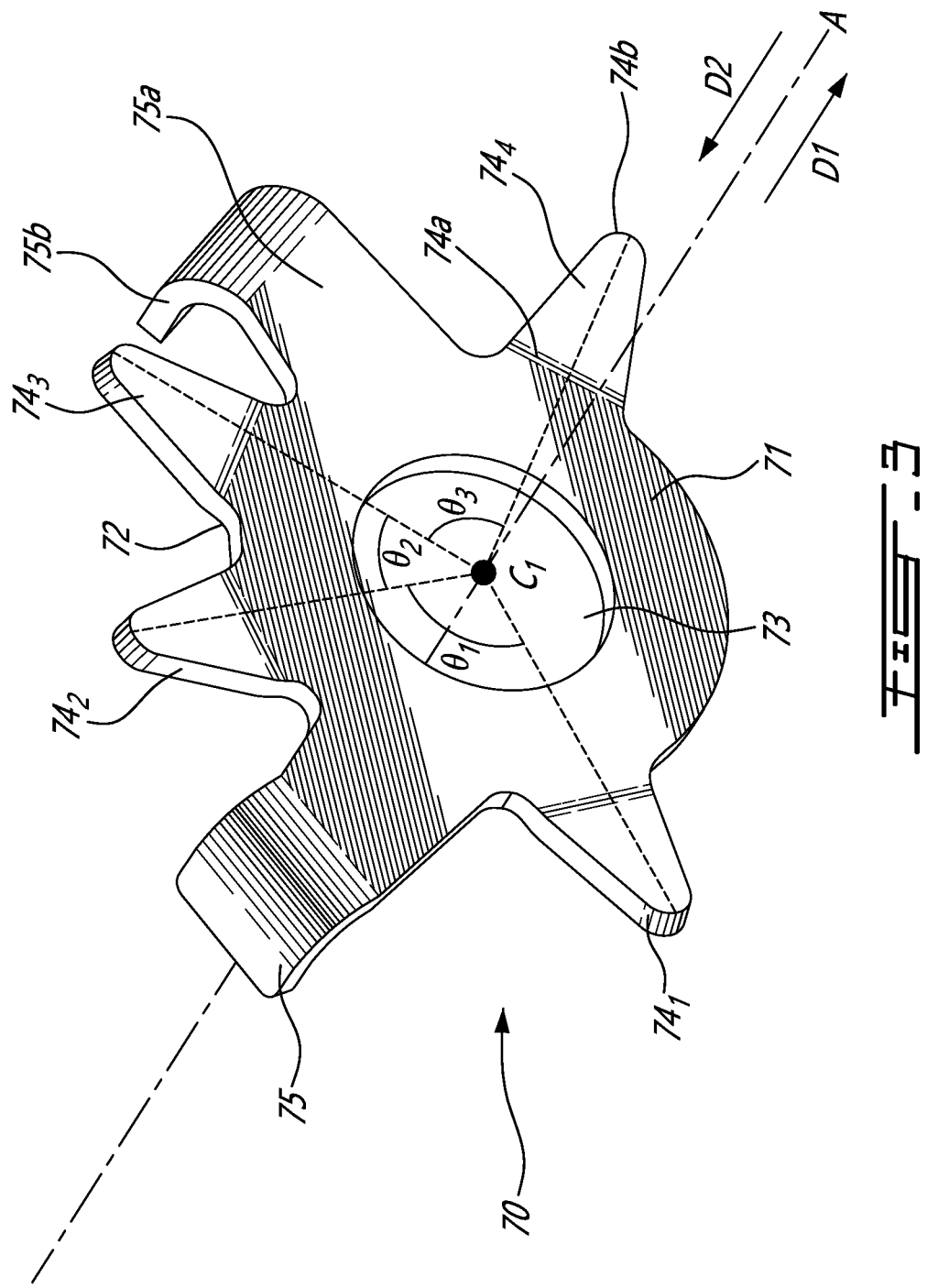

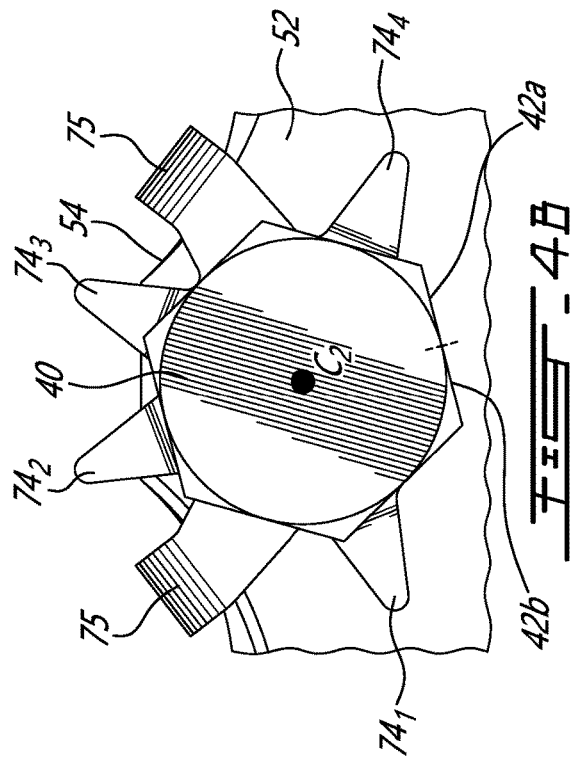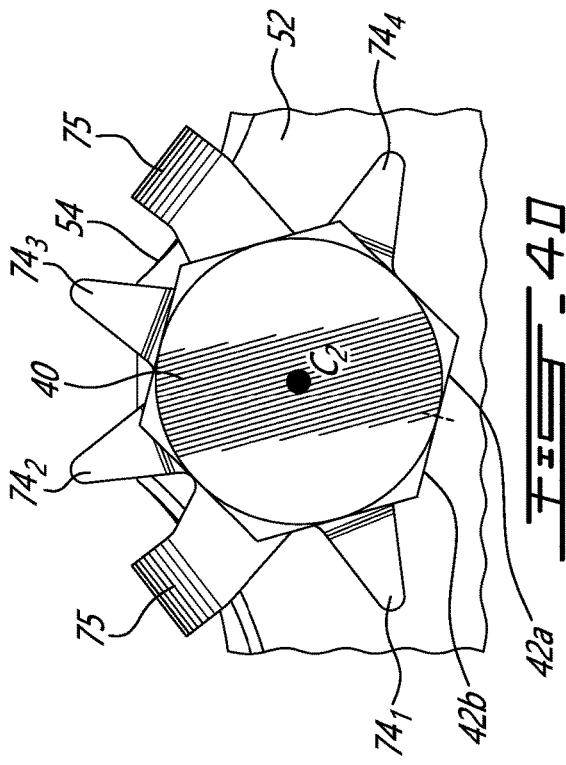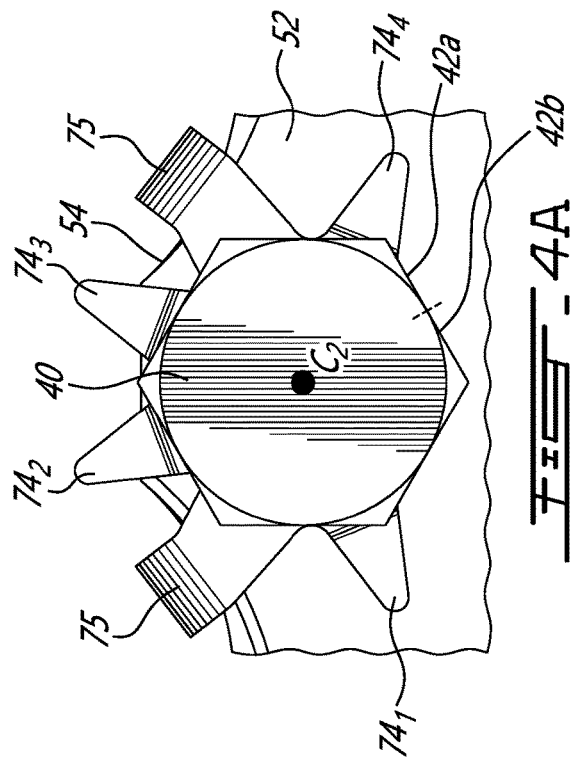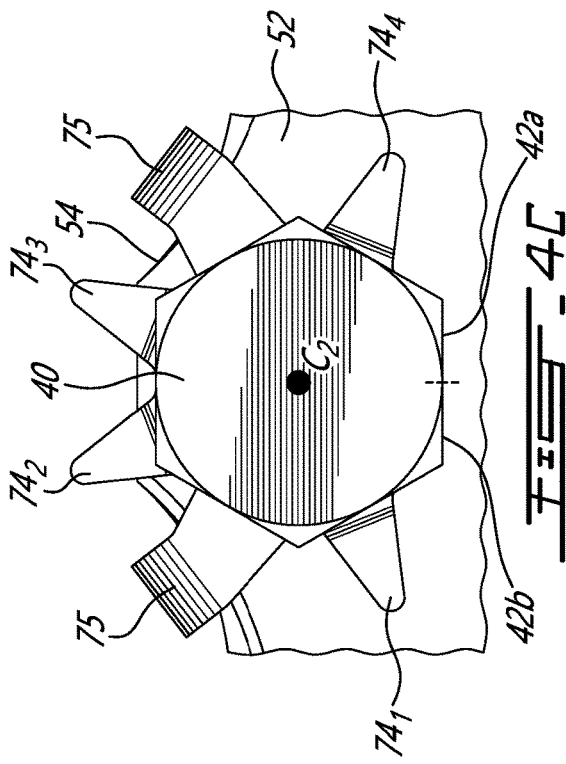

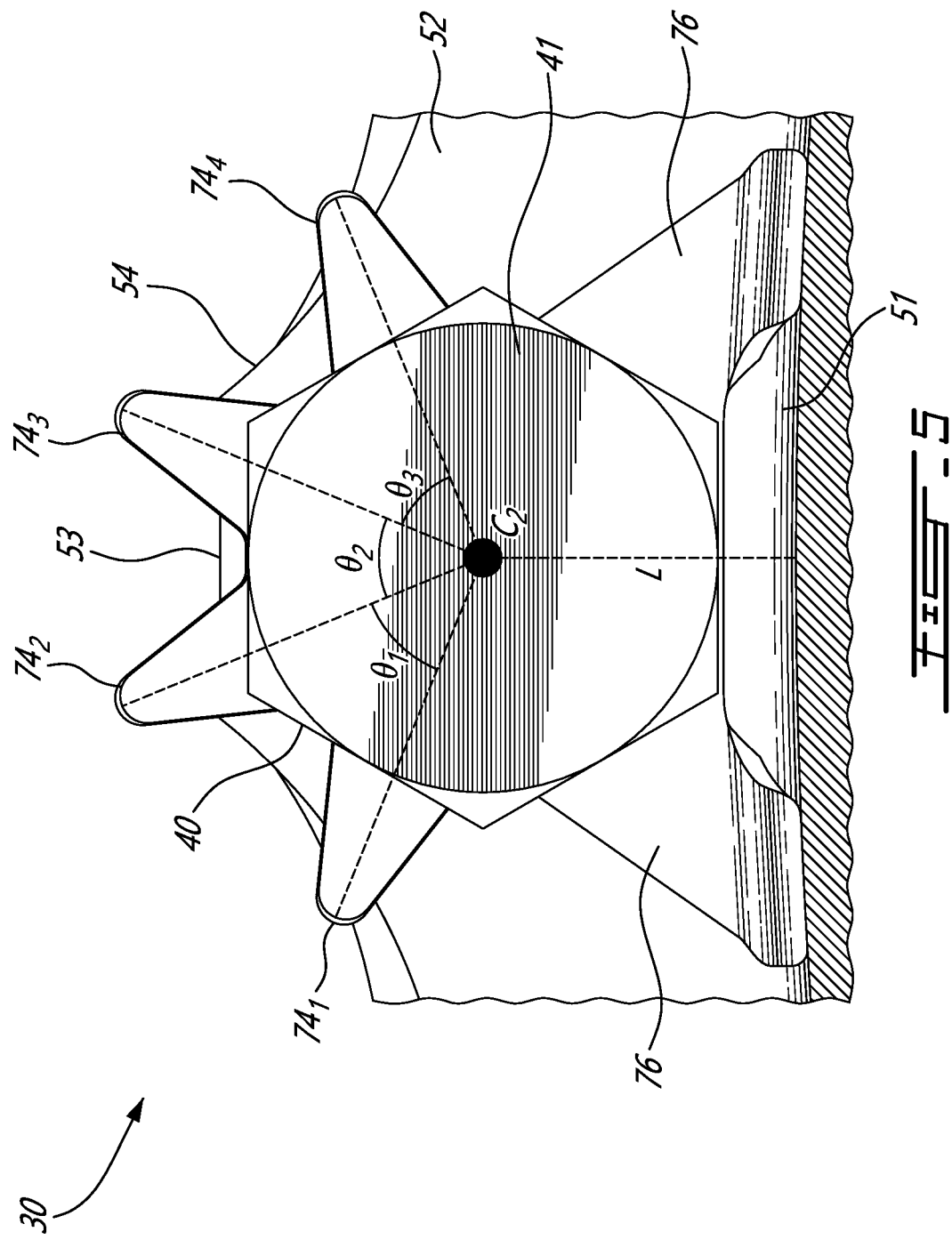

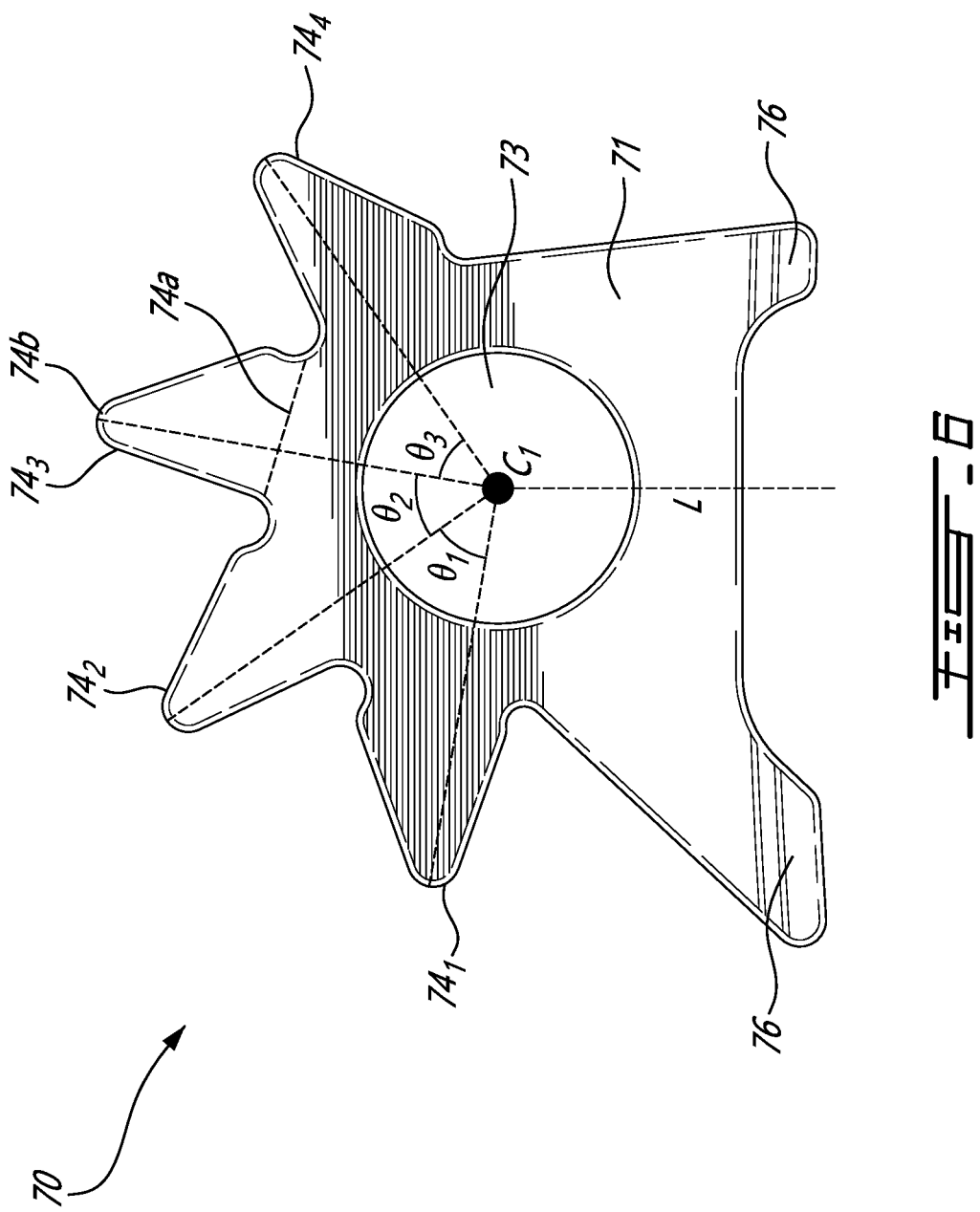

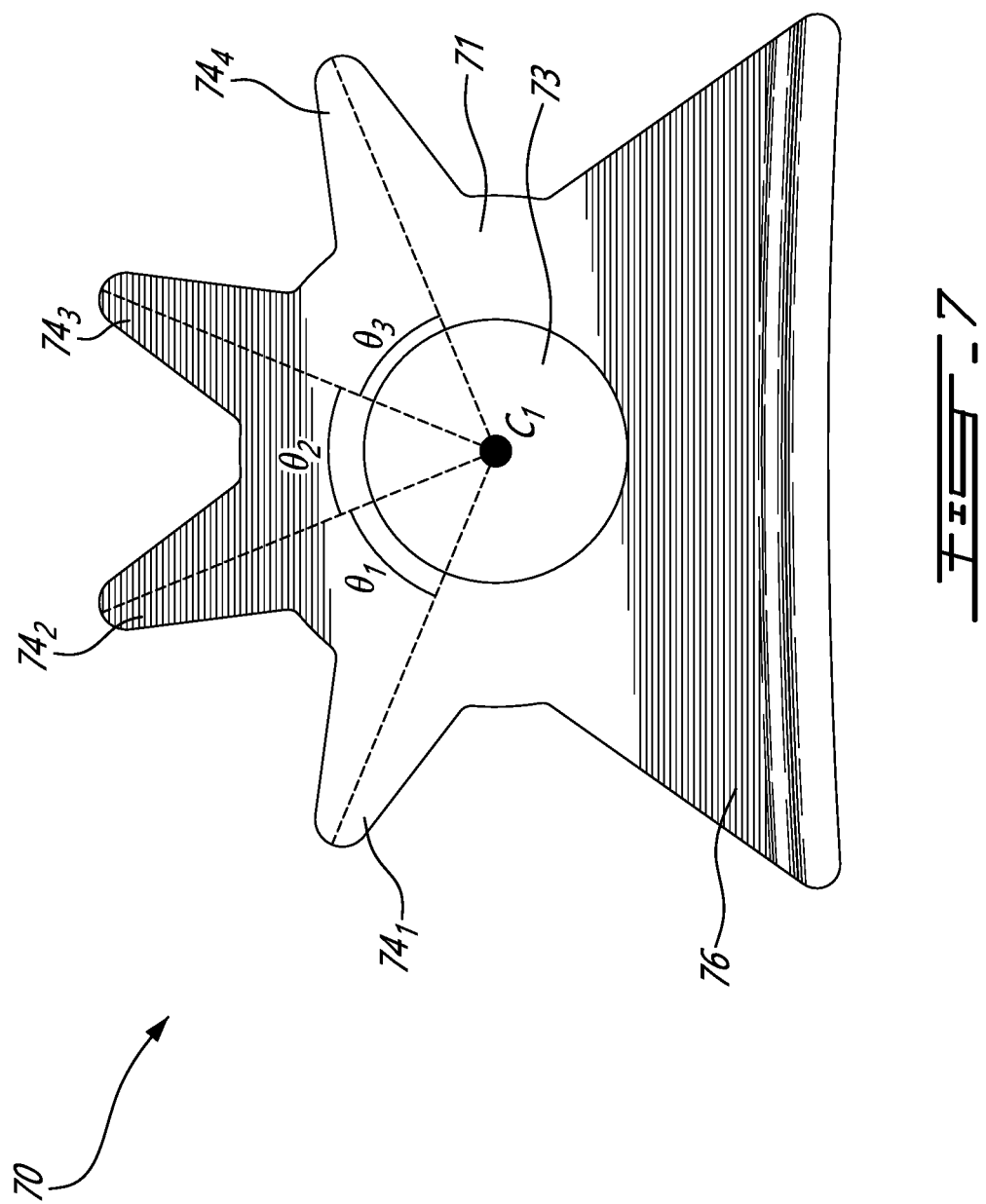

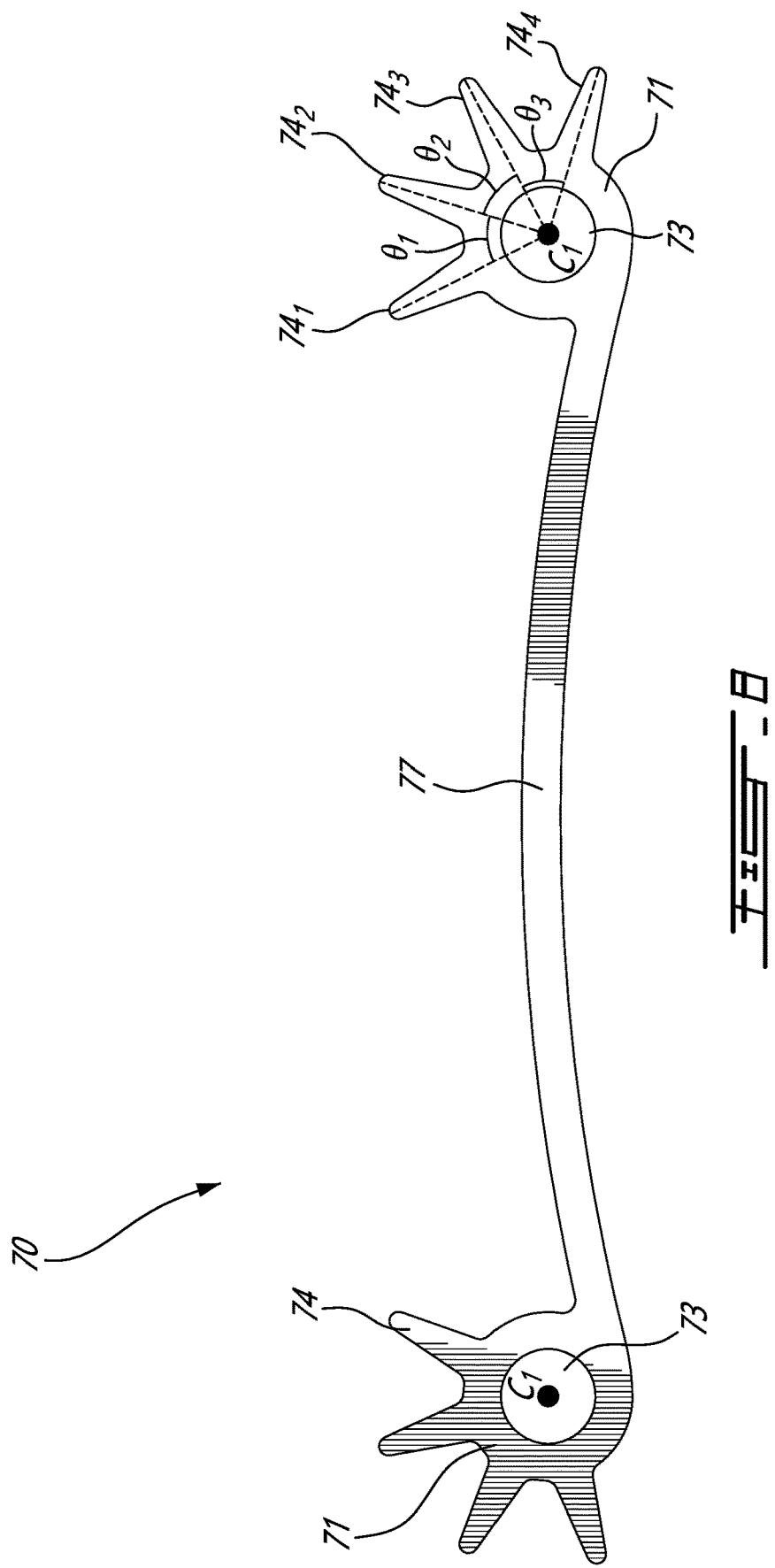

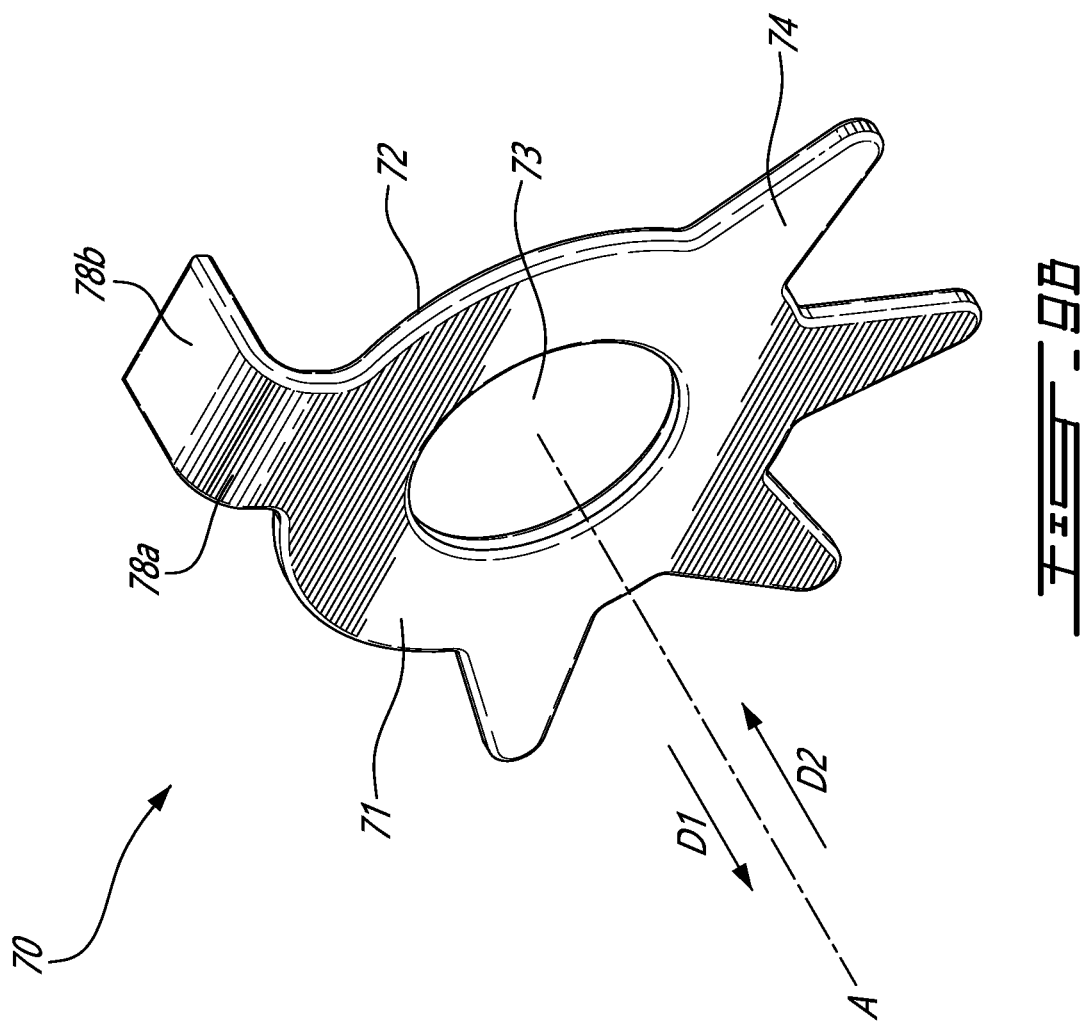

LOCKING TAB-WASHER

TECHNICAL FIELD

The disclosure relates generally to aircraft engines and, more particularly, to fasteners in aircraft engines.

BACKGROUND

Locking tab washer as used in aircraft engines to rotatably lock a fastener such as a bolt in place once torqued. Typical locking tab washers require a bolt head to be oriented at specific angles to provide satisfactory alignment of the locking tabs with the bolt head flats for locking. As such, the bolt may often require being over or under-torqued from its predetermined torque degree for satisfactory locking alignment. Improvements are thus desirable.

SUMMARY

In one aspect, there is provided a locking tab washer for rotatably locking a bolt fastened to a component in an aircraft engine, the bolt having a bolt head with repeated flat surfaces, the locking tab washer comprising: an opening extending from a front surface of the locking tab washer to a rear surface of the locking tab washer, with an axis defined through a center of the opening; at least four locking tabs positioned about the opening and circumferentially spaced apart from one another at integer multiples of a common angle relative to the center of the opening, the at least four locking tabs bendable towards the opening in a first direction relative to the axis to rotatably lock the bolt; and a retaining feature positioned about the opening and operable to rotatably retain the locking tab washer to the component.

In another aspect, there is provided a locking assembly for joining two components in an aircraft engine, comprising: a locking tab washer having an opening extending from a front surface of the locking tab washer to a rear surface of the locking tab washer with an axis defined through a center of the opening, the rear surface disposed against a first of the two components with the opening aligned with apertures in the first of the two components and a second of the two components, at least four locking tabs positioned about the opening and bendable towards the opening in a first direction relative to the axis, and a retaining feature positioned about the opening and engaging an anti-rotation surface of one of the two components; and a bolt having a bolt head with a plurality of flat surfaces, and a shank rotatably received through the opening and through the apertures in the two components, the bolt torqued to a predetermined degree, each of the plurality of flat surfaces of the bolt having a loaded half surface and an unloaded half surface when the bolt is torqued, at least one of the at least four locking tabs bendable towards the bolt head with at least half of its width aligned with a loaded half surface of a corresponding flat surface to prevent untorqueing of the bolt when the bolt is torqued.

In a further aspect, there is provided a method for joining two components in an aircraft engine, comprising: positioning a locking tab washer against a first of the two components with an opening in the locking tab washer aligned with apertures in the first of the two components and in a second of the two components; inserting a bolt through the opening and through the apertures in the two components; torqueing the bolt to a predetermined degree; and bending at least four locking tabs positioned about the opening in the locking tab washer towards a head of the bolt to rotatably lock the bolt, the at least four locking tabs having a predetermined angular distribution about the opening, the predetermined angular distribution selected so that at least one of the at least four locking tabs has at least half of its width aligned with a loaded half surface of a corresponding flat surface of the bolt regardless of a relative angular position between the head of the bolt and the locking tab washer.

BRIEF DESCRIPTION OF THE DRAWINGS

Reference is now made to the accompanying figures in which:

FIG. 3 is a perspective view of a locking tab washer for the locking assembly of FIG. 2;

FIGS. 4A-4D are front views of the locking assembly of FIG. 2 with the locking tab washer in various rotational positions;

FIG. 5 is a front view of a locking assembly in accordance with an embodiment of the present disclosure;

FIG. 6 is a front view of a locking tab washer in accordance with an embodiment of the present disclosure;

FIG. 7 is a front view of a locking tab washer in accordance with an embodiment of the present disclosure;

FIG. 8 is a front view of a locking tab washer in accordance with an embodiment of the present disclosure; and FIGS. 9A-9B are front and perspective views, respectively, of a locking tab washer in accordance with an embodiment of the present disclosure.

DETAILED DESCRIPTION

Figure 1:
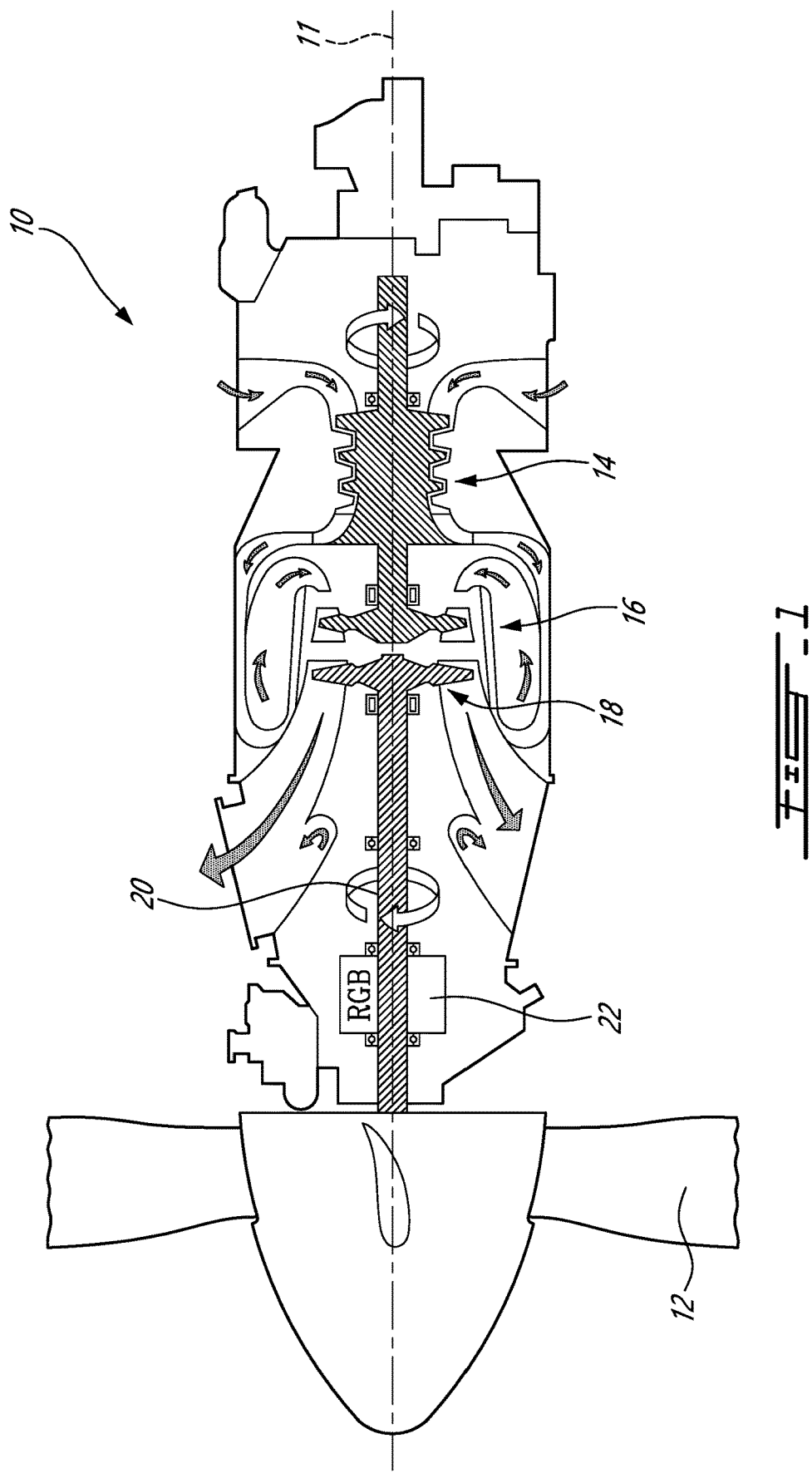
FIG. 1 is a schematic cross sectional view of a gas turbine engine.

FIG. 1 illustrates an aircraft engine, for instance, a gas turbine engine 10 of a type preferably provided for use in subsonic flight. The exemplified engine 10 is depicted in FIG. 1 is a turboprop having a propeller 12. The engine 10 has, in serial flow communication, a compressor section 14 for pressurizing the air, a combustor 16 in which the compressed air is mixed with fuel and ignited for generating an annular stream of hot combustion gases, and a turbine section 18 for extracting energy from the combustion gases. The engine 10 has a shaft 20 drivingly engaged to the propeller 12 via a reduction gear box 22. Although FIG. 1 depicts engine 10 as a reverse-flow turboprop-type engine, the present disclosure is applicable to other engine types as well, for instance turboshaft and turbofan type engines.

Figure 2:
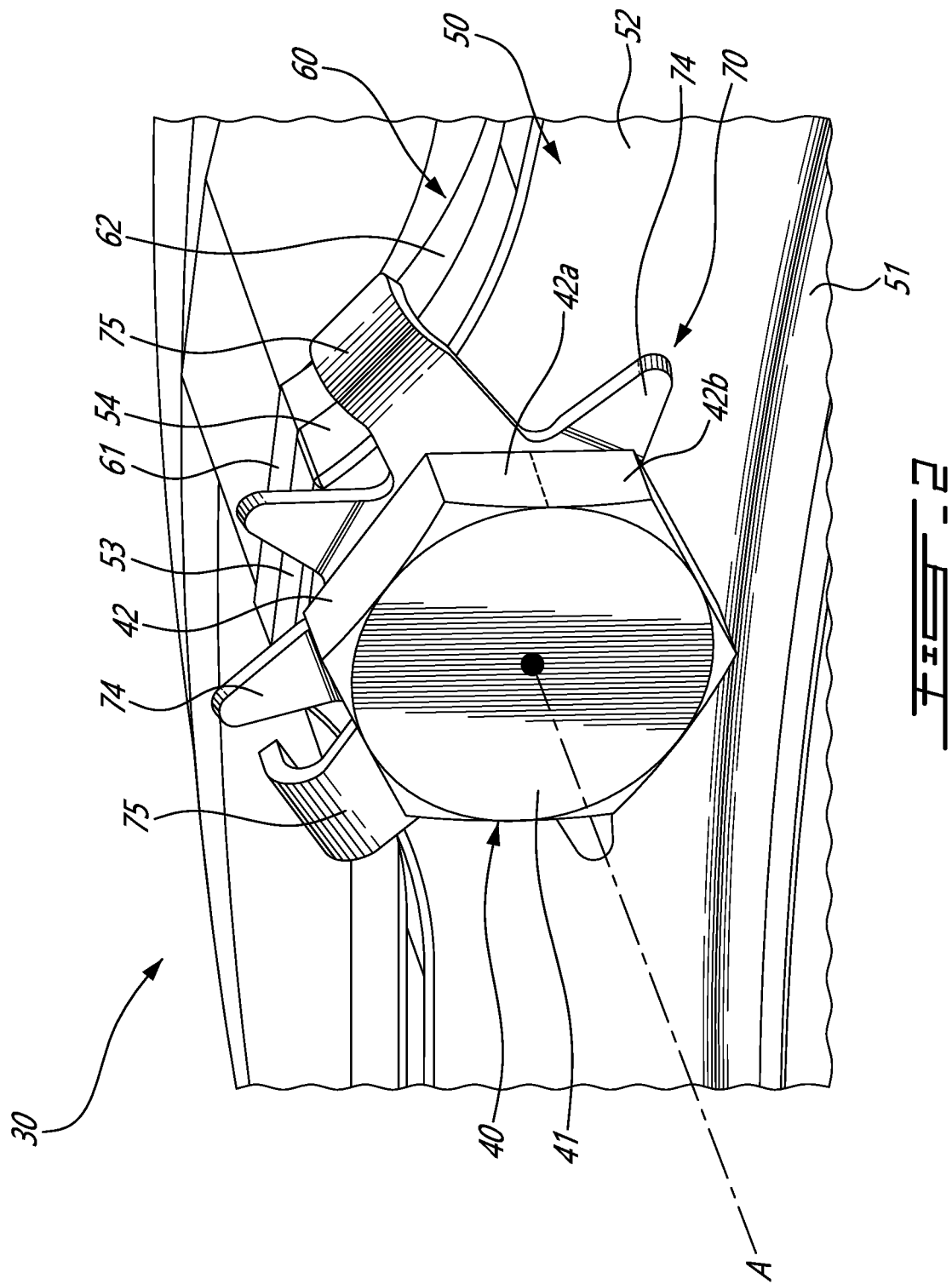
FIG. 2 is a perspective view of a locking assembly in accordance with an embodiment of the present disclosure.

Referring to FIG. 2, an exemplary locking assembly 30 within engine 10 according to the present disclosure is shown. In the depicted case, although not necessarily the case in all embodiments, a bolt 40 is operable to retain a first component 50 to an adjacent second component 60. In the depicted case, the first component 50 is a flange of an exhaust duct, and the second component 60 is a flange of a power turbine stator housing, although other components of the engine 10 may be contemplated as well. As will be discussed in further detail below, a locking tab washer 70 is operable to rotatably lock the bolt 40 in place once the bolt 40 is torqued to a predetermined degree, regardless of the rotational orientation of the bolt 40.

The depicted bolt 40 is a single hex bolt having a bolt head 41 with six flat surfaces 42 about its outer circumference. A partially or fully threaded shank (not shown) extends from the shank and is receivable through corresponding apertures (not shown) in the first and second components 50, 60. The bolt 40 is fastenable, for instance via a nut (not shown) rotatably engageable with a threaded end of the shank on an opposite side of the second component 60, illustratively on the hidden opposite side of the flange of the second component 60. Other means for fastening the bolt, for instance threading in one or both of the apertures in the first and second components 50, 60, may be contemplated as well. As will be discussed in further detail below, each flat surface 42 of the bolt head 41 is divided into two portions or half surfaces relative to a direction of rotation of the bolt: an unloaded half surface 42a and a loaded half surface 42b. After the bolt 40 is installed and torqued to a predetermined degree, for instance in a clockwise direction when looking at the page, pressure applied to one or more of the loaded half surfaces 42b by a corresponding portion of the locking tab washer 70 may prevent the bolt 40 from untorqueing, thereby preventing the assembly 30 from coming apart.

Referring additionally to FIG. 3, the depicted locking tab washer 70 includes a front surface 71, a rear surface 72, and a central opening 73 extending from the front surface 71 to the rear surface 72. An axis A is defined through a center $C_1$ of the opening 73. Upon assembly of the locking assembly 30, the bolt 40 is alignable with the opening 73 and apertures (not shown) in the first component 50 and second component 60 along the axis A. According to various embodiments of the present disclosure, the locking tab washer 70 may include at least four locking tabs 74 circumferentially oriented about the opening 73 with reference to the center $C_1$ so that, when the locking assembly 30 is assembled and the bolt torqued, the locking tabs 74 are indexed at unique locations or positions along the flat surfaces 42 of the bolt 40 so that the bolt may be rotatably locked by at least one locking tab 74, regardless of its rotational orientation. Various numbers of locking tabs 74 and relative circumferential spacing between tabs may be contemplated. To ensure unique positions or locations along the flat surfaces 42, the circularly repeating pattern of the bolt's flat surfaces 42 (i.e. three hundred degrees divided by six sides of a single hex bolt, giving sixty degrees) may be divided by the number of locking tabs 74 on the locking tab washer 70, and multiple integers of that result may be used as the circumferential spacing between circumferentially adjacent locking tabs 74.

The depicted locking tab washer 70 in FIG. 3 includes four locking tabs 74 positioned about the opening 73. Based on the above, the locking tabs 74 may be circumferentially spaced apart from each other at integer multiples of fifteen degrees. Illustratively, a first angle $\theta_1$ between circumferentially adjacent locking tabs $74_1$ and $74_2$ measures ninety degrees, a second angle $\theta_2$ between circumferentially adjacent locking tabs $74_2$ and $74_3$ measures forty five degrees, and a third angle $\theta_3$ between circumferentially adjacent locking tabs $74_2$ and $74_3$ measures ninety degrees. Other angles between adjacent locking tabs 74 may be contemplated as well.

In other cases, locking tab washers 70 may include more than four locking tabs 74. For instance, a locking tab washer 70 may include five locking tabs 74 that are circumferentially spaced apart from each other at integer multiples of twelve degrees. In various cases, variations of plus-or-minus one degree may apply with respect to the selected degree (or multiple thereof) of spacing.

As will be discussed in further detail below, the circumferential spacing between adjacent locking tabs 74 may allow the locking tab washer 70 to rotatably lock the bolt 40 once the bolt 40 is torqued to a predetermined degree regardless of the relative angle between the bolt head 41 and the locking tab washer 70 and without requiring the bolt 40 to be additionally over or under-torqued.

In the depicted case, the locking tabs 74 are bendable at a crease 74a at an intersection between the locking tab 74 and the front surface 71 of the locking tab washer 70. The locking tabs 74 are thus bendable towards the opening 73 in a first direction D1 relative to the axis A to rotatably retain or lock the bolt 40 in place once the bolt 40 is torqued, as will be discussed in further detail below. In the depicted embodiment, although not necessarily the case in all embodiments, the locking tabs 74 are pre-bent along respective creases 74a, thereby rendering the locking tab washer 70 mistake proof and only installable in its correct orientation. In other embodiments, one or more of the locking tabs 74 may be pre-bent along respective crease(s) 74a, for instance to indicate the correct orientation for installation. In the shown case, each locking tab 74 has a narrowing width as it extends from the crease 74a towards a radially distal end 74b thereof, forming a triangular-like cross-sectional shape. Other shapes for the locking tabs 74 may be contemplated as well.

The locking tab washer 70 further includes a retaining feature to rotatably retain the locking tab washer 74 to the first component 50 and/or the second component 60 by engaging a respective surface on the first component 50 and/or the second component 60 as the bolt 40 is torqued. In the embodiment shown in FIGS. 2-3, the retaining feature includes a pair of anti-rotation tabs 75 positioned about the circumference of the locking tab washer 70. Each anti-rotation tab 75 includes a first portion 75a extending radially outwardly relative to the opening 73 and a second portion extending in a second direction D2 relative to the axis A and opposite the first direction D1. In an assembled configuration, the anti-rotation tabs 75 are operable to engage radially outer surfaces of the first component 50 and the second component 60.

As depicted in FIG. 2, the first component 50 is an exhaust duct having a radially inner surface 51, a flange 52 with an aperture (not shown) for the bolt's shank (not shown) to pass therethrough and a radially outer surface 53 with scalloped edges 54. The depicted second component 60, the turbine rotor stator housing, similarly has a flange with an aperture (not shown) for the bolt's shank to pass therethrough and a radially outer surface 61 with scalloped edges 62. Other engine components may be contemplated as well. In the depicted case, the anti-rotation tabs 75 are operable to abut against the scalloped edges 54, 62 of the first component 50 and the second component 60, respectively, when the locking tab washer 70 is installed. The first portions 75a may be dimensioned, i.e. its radial length, so that only one of the anti-rotation tabs 75 may abut a respective scalloped edge 54 of the first component 50 and a respective scalloped edge 62 of the second component 60 at a time. The abutting anti-rotation tab 75 may be alternated, for instance, by rotating the locking tab washer 70 relative to the center $C_1$.

An exemplary method for joining the two components 50, 60 will now be described. The locking tab washer 70 is positioned against the first component 50 the opening 73 aligned with apertures (not shown) in the components 50, 60. The bolt 40 is inserted through the opening 73 and through the apertures in the components 50, 60. The bolt 40 is tightened to a predetermined degree. The at four locking tabs 74 positioned about the opening 73 in the locking tab washer 70 are bent towards the head 41 of the bolt 40 to rotatably lock the bolt 40, with at least one of the at least four locking tabs 74 having a major portion of its width, for instance at least half of its width, aligned with a loaded half surface 42b of a corresponding flat surface 42 of the bolt 40 to prevent untorqueing of the bolt 40. Variations and additional steps may be contemplated as well.

In the embodiment depicted in FIG. 2, the above-described method may further include abutting one of the anti-rotation tabs 75 against the scalloped edges 54 as the bolt 40 is being torqued. The selected anti-rotation tab 75 is that which requires the applied pressure, for instance against the other anti-rotation tab 75 via a drift or other like tool, to be in a rotational direction opposite the torqueing of the bolt 40. Thus, once the bolt is torqued, any untorqueing motion will be interrupted by the anti-rotation tab 75 abutting the scalloped edges 54 and/or 62 (or other radially-outward surface of the first 50 or second 60 component).

Referring additionally to FIGS. 4A-4D, regardless of the orientation of the torqued bolt 40, at least one of the illustratively four locking tabs 74 will be in a position to lock the bolt 40 in place once bent towards the bolt head 41 due to its alignment with respective loaded half surface 42b. FIGS. 4A-4D illustrate four rotational orientations of the bolt 40 with reference to a rotational center $C_2$ of the bolt 40 aligned with axis A. Illustratively, the bolt 40 is rotated by fifteen degrees in a clockwise direction from FIG. 4A to FIG. 4B, from FIG. 4B, to FIG. 4C, and from FIG. 4C, to FIG. 4D to depict the operability of the four locking tabs 74, denoted in FIGS. 4A-4D as $74_1$, $74_2$, $74_3$ and $74_4$. In the bolt's position as depicted in FIG. 4A, locking tabs $74_2$ and $74_4$ are operable to rotatably lock the bolt 40 once bent by having at least half of their widths aligned with respective loaded half surfaces 42b. In the bolt's position as depicted in FIG. 4B, locking tabs $74_1$ and $74_4$ are operable to rotatably lock the bolt 40 once bent by having at least half of their widths aligned with respective loaded half surfaces 42b. In the bolt's position as depicted in FIG. 4C, locking tabs $74_1$ and $74_3$ are operable to rotatably lock the bolt 40 once bent by having at least half of their widths aligned with respective loaded half surfaces 42b. In the bolt's position as depicted in FIG. 4D, locking tabs $74_2$ and $74_3$ are operable to rotatably lock the bolt 40 once bent by having at least half of their widths aligned with respective loaded half surfaces 42b. Other combinations of bolt orientations and locking tabs 74 may be contemplated as well. Regardless of the orientation of the bolt 40, the arrangement of the locking tabs 74 about the opening 73 may ensure that at least one of the locking tabs 74 may prevent untorqueing of the bolt 40.

In other embodiments, other retaining features for the locking tab washer 70 may be contemplated. Referring to FIG. 5, in the depicted embodiment, the locking tab washer 70 includes a pair of feet 76 extending radially outwardly from the opening 73 and operable to retain the locking tab washer 70 in place. Once the locking tab washer 70 is installed on the first component 50, illustratively the exhaust duct flange 52, the feet 76 are operable to abut against a radially inner surface 51 of the first component 50, illustratively an outer diameter of the exhaust duct. As was the case in the previous embodiment, one of the two feet 76 may be operable to abut the radially inner surface 51 at a time, for instance based on the direction of rotation of the torqued bolt 40. In the embodiment shown in FIG. 5, the two feet are shown to be symmetric about a center line L normal to the center $C_2$ and axis A. In other cases, for instances as depicted by the locking tab washer shown in FIG. 6, the two feet 76 may be asymmetric about the center line L, i.e. having different dimensions and shapes. In other cases, for instance as depicted by the locking tab washer 70 in FIG. 7, the locking tab washer 70 may include a single foot 76 operable to abut the radially inner surface 51 of the first component 50 upon torqueing of the bolt 40. Various sizes and shapes of the foot/feet 76 may be contemplated, for instance on the type and dimensions of the first component 50. In each of the shown locking tabs washers 70 of FIGS. 5-7, the locking tabs 74 are shown to be circumferentially spaced apart, i.e. having first angle $\theta_1$, second angle $\theta_2$, and third angle $\theta_3$ of forty five degrees from one another for optimized bolt locking. Other relative angles second angle $\theta_1$, $\theta_2$, $\theta_3$ may be contemplated as well. Other relative angles may be contemplated as well.

Referring to FIG. 8, in some embodiments, the locking tab washer 70 may include two openings 73 and be operable to rotatably lock two adjacent bolts 40. Each opening 73 has a center $C_1$ with an axis A protruding therethrough. This locking tab washer 70 may be referred to as a gang tab washer, as the retaining feature includes a linking member 77 joining a first opening 73 to a second opening 73. Each opening 73 is surrounded by locking tabs 74, illustratively four locking tabs 74. In the depicted case, the locking tabs 74 are shown to be circumferentially spaced apart, i.e. having first angle $\theta_1$, second angle $\theta_2$, and third angle $\theta_3$ of forty five degrees from one another for optimized bolt locking. Other relative angles $\theta_1$, $\theta_2$, $\theta_3$ may be contemplated as well. In the depicted case, each opening 73 is surrounded by locking tabs 74 circumferentially spaced apart in a same arrangement, i.e. with forty five degree spacing between circumferentially-adjacent locking tabs 74. In other cases, the circumferential arrangement may differ around one opening 73 and around the other. In the depicted case, the retaining feature, i.e. the linking member 77, may not require engagement with the other components of the locking assembly 30, for instance the first component 50 or the second component 60, as the presence of the two torqued bolts 40 provide retention to each other via the linking member 77.

Figure 9A:
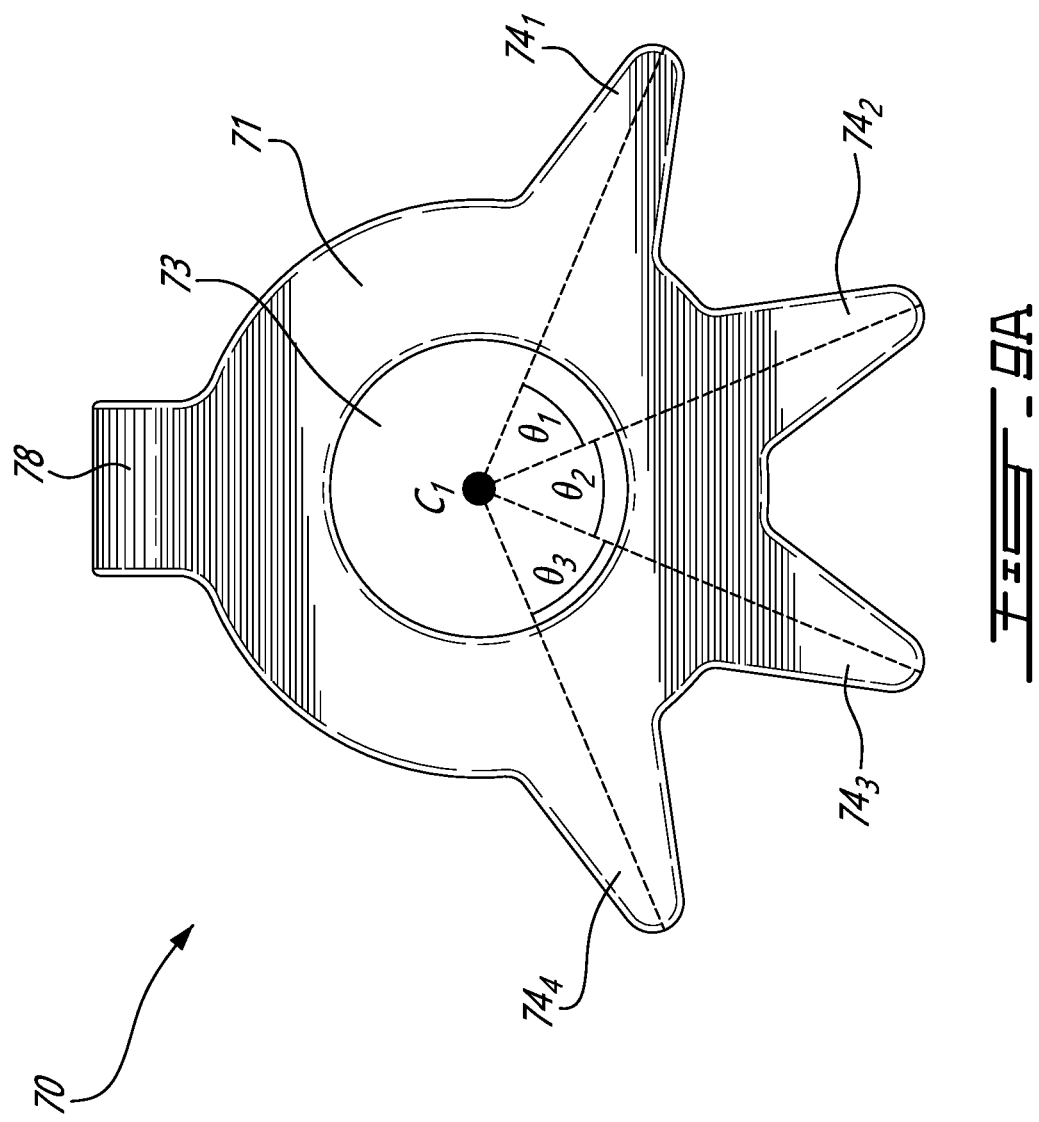

Referring to FIG. 9, in some embodiments, the locking tab washer 70 may include as a retaining feature a key 78 protruding in the second direction D2 opposite the first direction D1. The key 78 has a first portion 78a protruding radially outwardly relative the opening 73 and a second portion 78b protruding in the second direction D2 and operable to engage with a slot in the first component 50 to prevent rotation of the locking tab washer 70 with respect to the first component 50 once installed, thus retaining the bolt 40 to the first component 50 once the bolt 40 is torqued and the locking tabs 74 bent. In the depicted locking tabs washer 70 of FIGS. 9A-9B, the locking tabs 74 are shown to be circumferentially spaced apart, i.e. having first angle $\theta_1$, second angle $\theta_2$, and third angle $\theta_3$ of forty five degrees from one another for optimized bolt locking. Other relative angles second angle $\theta_1$, $\theta_2$, $\theta_3$ may be contemplated as well.

It can be appreciated from the foregoing that at least some embodiments have a locking tab washer 70 with locking tabs 74 providing bolt-locking functionality independently of the orientation of the bolt head 41, thereby allowing the bolt 40 to be torqued to its predetermined degree rather than under or over-torqued to ensure proper rotational locking, which may improve the bolt's sturdiness and reliability in the locking assembly 30.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A locking tab washer for rotatably locking a bolt fastened to a component in an aircraft engine, the bolt having a bolt head with repeated flat surfaces, the locking tab washer comprising:
   an opening extending from a front surface of the locking tab washer to a rear surface of the locking tab washer, with an axis defined through a center of the opening;
   at least four locking tabs positioned about the opening and circumferentially spaced apart from one another at integer multiples of a common angle relative to the center of the opening, the at least four locking tabs bendable towards the opening in a first direction relative to the axis to rotatably lock the bolt; and
   a retaining feature positioned about the opening and operable to rotatably retain the locking tab washer to the component;
   wherein the retaining feature includes a pair of anti-rotation tabs, each anti-rotation tab having a first portion extending radially outwardly from the opening and a second portion extending in a second direction relative to the axis opposite the first direction, the anti-rotation tabs operable to engage scalloped edges of a radially-outward surface of the component.

2. The locking tab washer as defined in claim 1, wherein the at least four locking tabs include four locking tabs circumferentially spaced apart from one another at integer multiples of fifteen degrees.

3. The locking tab washer as defined in claim 2, wherein a first and a second of the four locking tabs are circumferentially spaced apart by ninety degrees, the second and a third of the four locking tabs are circumferentially spaced apart by forty five degrees, and the third and a fourth of the four locking tabs are circumferentially spaced apart by ninety degrees.

4. The locking tab washer as defined in claim 2, wherein a first and a second of the four locking tabs are circumferentially spaced apart by ninety degrees, the second and a third of the four locking tabs are circumferentially spaced apart by ninety degrees, and the third and a fourth of the four locking tabs are circumferentially spaced apart by ninety degrees.

5. The locking tab washer as defined in claim 1, wherein the retaining feature includes at least one foot extending radially outwardly relative to the opening and operable to abut an engagement surface of the component to rotatably retain the locking tab washer to the component.

6. The locking tab washer as defined in claim 1, wherein the retaining feature includes a key having a first portion extending radially outwardly relative to the opening and a second portion extending in a second direction relative to the axis opposite the first direction, the key operable to engage a slot in the component.

7. The locking tab washer as defined in claim 1, further comprising a second opening extending from a front surface of the locking tab washer to a rear surface of the locking tab washer, with a second axis defined through a center of the second opening, at least four additional locking tabs positioned about the second opening and circumferentially spaced apart from one another at integer multiples of forty five degrees with reference to the center of the second opening, the at least four additional locking tabs bendable towards the opening in a first direction relative to the axis to rotatably lock a second bolt insertable through the opening, wherein the retaining feature extends between the opening and the second opening.

8. The locking tab washer as defined in claim 1, wherein one or more of the at least four locking tabs are pre-bent in the first direction relative to the axis.

9. A locking assembly for joining two components in an aircraft engine, comprising:
   a locking tab washer having an opening extending from a front surface of the locking tab washer to a rear surface of the locking tab washer with an axis defined through a center of the opening, the rear surface disposed against a first of the two components with the opening aligned with apertures in the first of the two components and a second of the two components, at least four locking tabs positioned about the opening and bendable towards the opening in a first direction relative to the axis, and a retaining feature positioned about the opening and engaging an anti-rotation surface of one of the two components, the anti-rotation surface defined by a scalloped edge of a radially outward surface of one of the two components; and
   a bolt having a bolt head with a plurality of flat surfaces, and a shank rotatably received through the opening and through the apertures in the two components, the bolt torqued to a predetermined degree, each of the plurality of flat surfaces of the bolt having a loaded half surface and an unloaded half surface when the bolt is torqued, at least one of the at least four locking tabs bendable towards the bolt head with at least half of its width aligned with a loaded half surface of a corresponding flat surface to prevent untorqueing of the bolt when the bolt is torqued;
   wherein the retaining feature includes a pair of anti-rotation tabs, each anti-rotation tab having a first portion extending radially outwardly from the opening and a second portion extending in a second direction relative to the axis opposite the first direction, the anti-rotation tabs operable to engage the scalloped edge.

10. The locking assembly as defined in claim 9, wherein the retaining feature includes a foot extending radially outwardly relative to the opening and operable to abut an engagement surface of the first component to rotatably retain the locking tab washer to the first component.

11. The locking assembly as defined in claim 9, wherein the retaining feature includes a key having a first portion extending radially outwardly relative to the opening and a second portion extending in a second direction relative to the axis opposite the first direction, the key operable to engage a slot in the first component.

12. The locking assembly as defined in claim 9, wherein the locking tab washer further includes a second opening extending from a front surface of the locking tab washer to a rear surface of the locking tab washer, with a second axis defined through a center of the second opening, at least four additional locking tabs positioned about the second opening and bendable towards the opening in a first direction relative to the second axis to rotatably lock a second bolt insertable through the opening, wherein the retaining feature includes a linking member extends between and operatively coupling the opening and the second opening.

13. The locking assembly as defined in claim 9, wherein the at least four locking tabs include four locking tabs circumferentially spaced apart from one another at integer multiples of fifteen degrees.

* * * * *